United States Patent [19]
Kleber et al.

[11] 3,956,118
[45] May 11, 1976

[54] REMOVAL OF PHOSPHATE FROM WASTE WATER

[75] Inventors: Eugene V. Kleber, Woodland Hills; Howard L. Recht, Northridge, both of Calif.

[73] Assignee: Rockwell International Corporation, El Segundo, Calif.

[22] Filed: Oct. 1, 1970

[21] Appl. No.: 77,389

Related U.S. Application Data

[63] Continuation-in-part of Ser. No. 731,540, May 23, 1968, abandoned.

[52] U.S. Cl. ................................ 210/45; 210/47
[51] Int. Cl.² ................................ C02C 5/02
[58] Field of Search ................ 210/51–54, 210/45, 47, 42; 23/105, 109; 423/21, 263, 311

[56] References Cited
UNITED STATES PATENTS

| | | | |
|---|---|---|---|
| 2,872,286 | 2/1959 | Finzel | 210/42 X |
| 3,259,568 | 7/1966 | Jordan et al. | 210/42 X |
| 3,347,786 | 10/1967 | Baer et al. | 210/45 |
| 3,617,569 | 11/1971 | Daniels et al. | 210/53 |
| 3,692,671 | 9/1972 | Recht et al. | 210/45 |
| 3,736,255 | 5/1973 | Ghassemi et al. | 210/45 |

Primary Examiner—Thomas G. Wyse
Attorney, Agent, or Firm—L. Lee Humphries; Henry Kolin

[57] ABSTRACT

A method for chemically removing phosphates from waste waters by treating the phosphate-containing waste water with a trivalent rare earth salt, generally as a mixture of such salts, to form an insoluble rare earth phosphate precipitate, and then separating the precipitate from the waste water. The rare earth precipitant salt, such as lanthanum chloride or sulfate, may be regenerated by treating the rare earth phosphate precipitate with a strong or weak alkali as regenerant, preferably aqueous sodium hydroxide or sodium carbonate, to form a soluble alkali metal phosphate. The aqueous alkali regenerant may be recovered by treatment of the formed sodium phosphate with lime to precipitate the phosphate as a calcium phosphate complex salt.

Where it is desired to precipitate phosphate but avoid regeneration of the rare earth precipitant salt, a combination treatment using aluminum-lanthanum or iron-lanthanum as precipitant salt is preferred.

14 Claims, 1 Drawing Figure

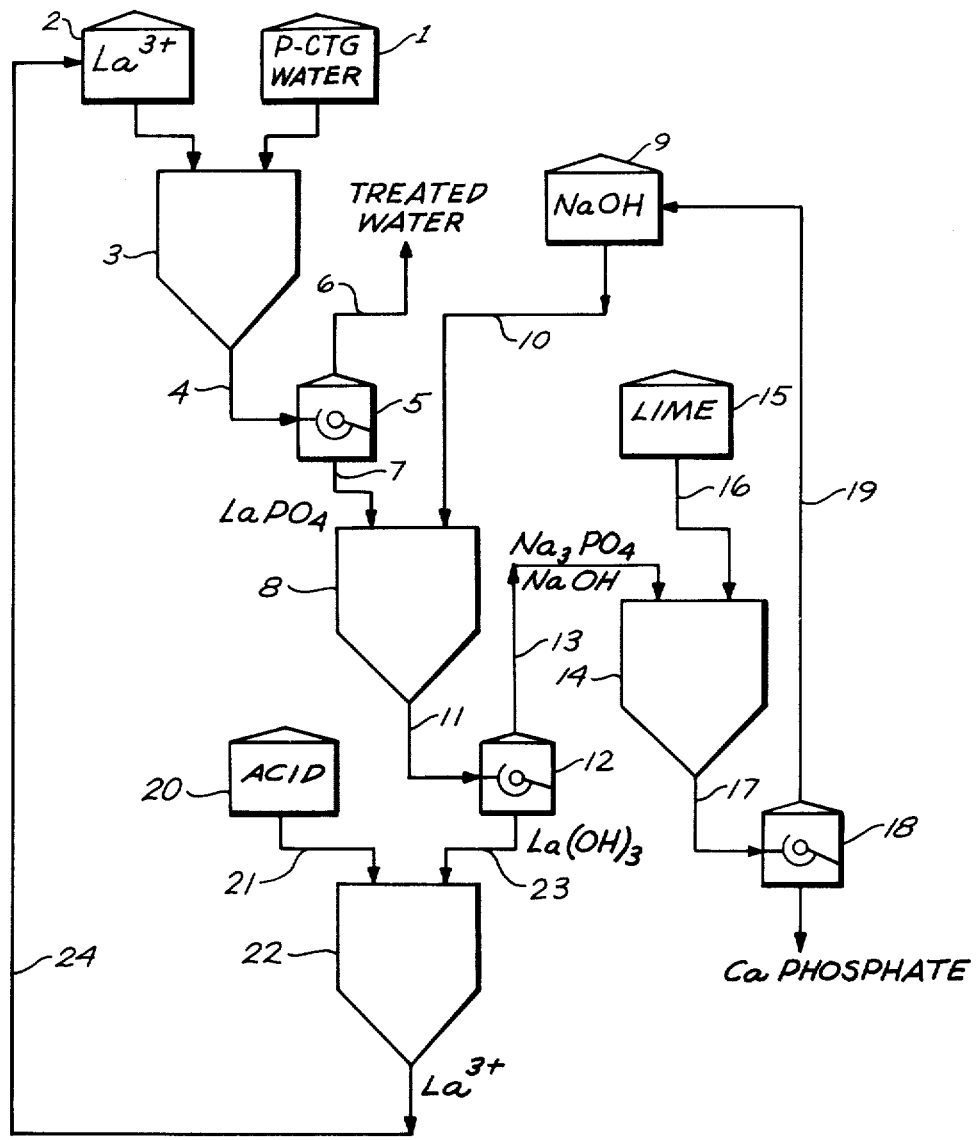

3,956,118

REMOVAL OF PHOSPHATE FROM WASTE WATER

CROSS REFERENCES TO RELATED APPLICATIONS

This application is a continuation-in-part of application Ser. No. 731,540, filed May 23, 1968 and since abandoned.

BACKGROUND OF THE INVENTION

This invention relates to a method for the chemical removal of phosphorus ions from waste water. It particularly relates to a method wherein both simple and condensed phosphates present in waste water are reacted with a trivalent rare earth ion to form an insoluble rare earth phosphate.

The usefulness to mankind of many lakes, rivers and bays in and near population centers is being destroyed because of the influx into these bodies of water of untreated or incompletely treated municipal, industrial and agricultural waste waters containing simple and condensed phosphate salts. These salts cause drastic changes in the biological make-up of these waters. The finding of inexpensive, reliable and efficient ways to remove phosphorus from waste water is essential to restore and maintain these natural water resources.

Many chemical, biological, and combined chemical-biological methods have been used or suggested for removal of phosphates from waste water. The chemical precipitation of phosphate has been widely investigated using calcium, iron, and aluminum salts. Considerable success has been reported, particularly with the use of aluminum and iron salts in a tertiary processing stage in the treatment of waste waters. However, while these methods have been successfully used and have advantageous features, they suffer from several disadvantages. Considerable excess of chemicals is usually required for efficient removal of dissolved phosphate. Generally, careful pH control to avoid both complexing effects and hydroxide precipitation is also required. In addition, the usual processes for regenerating the precipitant, which are generally required because of economic considerations, are complicated and relatively inefficient.

SUMMARY OF THE INVENTION

It is an object of the present invention to provide a highly efficient process for the direct precipitation of phosphates from waste water using a rare earth salt, alone or in combination with a precipitant selected from iron, aluminum, and calcium salts.

It is a further object to provide an economic process for the regeneration of the rare earth reactant using an alkali or acid regeneration process.

In accordance with this invention, a process is provided for chemically removing phosphorus ions from a waste water by directly precipitating these ions in the waste water by a mixture of soluble rare earth salts of the lanthanide series, to form an insoluble precipitate, and separating this precipitate from the waste water. Municipal waste waters treated in accordance with the process of this invention may constitute raw sewage treated in a primary processing stage. However, the present process is particularly applicable to the treatment in a tertiary processing stage of the waste water effluent from a secondary processing stage. Where the excess rare earth precipitant is present in the waste water, it may be eliminated by adding sodium carbonate or sodium bicarbonate to the waste water, either prior to, during, or subsequent to the precipitation step. Or the phosphate precipitation is performed in a waste water already buffered with carbonate ion because of the prior history of the waste water.

For an economically attractive process, recovery and reuse of the rare earth precipitant is generally required. Thus in the treatment of waste water in a tertiary stage using a rare earth precipitant, the formed phosphate precipitate is regeneratively treated with an acid or alkali, preferably by an alkali regeneration process using a concentrated aqueous solution of the hydroxides, carbonates, or bicarbonates of sodium or potassium so as to regenerate the rare earth precipitant. The alkali regenerant may also be recovered for reuse in the process by treatment of the formed alkali metal phosphate with lime, or lime and carbon dioxide.

In accordance with another feature of this invention, it has been found that a treatment of the waste water using a combination of rare earth precipitant with aluminum, iron, or calcium salts is particularly suitable where it is desired to effect substantial removal of the phosphate present in the waste water while at the same time avoiding the economic need for recovery of the rare earth precipitant. Thus moderate doses of Al(III) or Fe(III) salts may be used together with the addition of small expendable quantities of La(III) salts to effect substantial removal of the phosphate. Thereby the use of large excesses of aluminum or ferric salts, ordinarily required to effect substantial precipitation of phosphate where used alone, as well as the necessity for regeneration of the rare earth precipitant is eliminated. However, the rare earth precipitant may, if desired, be separately recovered and regenerated in this mode of treatment.

Where the rare earth chemical precipitant is the principal or sole precipitant used, the higher cost at present of such precipitants compared with those precipitants heretofore used is an economically disadvantageous feature which would ordinarily eliminate consideration of such rare earth precipitants. However, we have discovered that the present process eliminates many of the disadvantages associated with those heretofore known by providing more efficient and more complete precipitation of phosphate and not requiring critical control techiques. These features, taken together with the associated regeneration step, make the present process economically attractive compared with those heretofore used. Thus, even where regeneration is not used, a relatively inexpensive chemical process is provided for reducing the phosphate content of waste waters below 0.1 mg/liter P and with a negligible residual cation concentration of the precipitant remaining.

In the preferred aspects of practicing the invention, the trivalent rare earth precipitant added to the phosphate-containing waste water is in the form of its chloride, sulfate, nitrate or hydroxide. The rare earth ions react with the simple or complex phosphate ions, forming an insoluble rare earth phosphate precipitate which is removed, preferably by filtration, thereby providing an essentially phosphate-free waste water. The starting rare earth compound, particularly where present as sole or principal precipitant, is then preferably regenerated by treatment of the insoluble precipitate with a strong acid or with an alkali such as sodium hydroxide or carbonate.

For the regeneration step, the insoluble rare earth phosphate is treated, preferably with concentrated aqueous sodium hydroxide, generally at a pH greater than 11, or with concentrated sodium carbonate or bicarbonate to convert the rare earth phosphate to an insoluble rare earth hydroxide or carbonate and produce a soluble sodium phosphate. The insoluble rare earth hydroxide or carbonate is separated from the solution containing dissolved sodium phosphate and sodium hydroxide or carbonate by filtration or an equivalent operation. The rare earth precipitant is re-used in the process either by adding the rare earth hydroxide or carbonate directly to an untreated acidic waste water, or else by first reacting the rare earth hydroxide or carbonate with hydrochloric or sulfuric acid to reconstitute the more soluble rare earth chloride or sulfate for return to the process as a soluble rare earth salt precipitant.

The sodium hydroxide or carbonate-bicarbonate solution containing dissolved sodium phosphate may be treated respectively with lime or lime followed by carbon dioxide. This then serves to reconstitute the respective sodium hydroxide or carbonate regenerant and form an insoluble precipitate, e.g., $Ca_{10}(OH)_2(PO_4)_6$. This precipitate is then removed by filtration or an equivalent operation, the reconstituted sodium hydroxide or carbonate-bicarbonate solution being returned for recycle in the process.

Because of economic considerations, all stages of the process are generally performed at ambient temperatures. However, for certain individual stages, particularly during regeneration, the temperature may be increased to promote reaction rate or component solubility.

BRIEF DESCRIPTION OF THE DRAWING

The sole FIGURE of the drawing shows a schematic diagram illustrating the treatment of a phosphorus-containing waste water to precipitate the phosphates therefrom followed by regeneration of the rare earth reactant using an alkali regeneration process.

DESCRIPTION OF THE PREFERRED EMBODIMENTS

The present invention is broadly directed to a process for chemically removing phosphorus ions from waste water during a primary or tertiary treatment stage by directly precipitating these ions by reaction with a trivalent rare earth ion precipitant, alone or in combination with a conventional precipitant, to form an insoluble precipitate. The presence of excess rare earth precipitant in the waste water is avoided by performing the precipitation in the presence of a carbonate-buffered waste water, either naturally occurring or by the addition of sodium carbonate or bicarbonate to the waste water either prior to, concurrent with, or subsequent to the precipitation step. In such a tertiary treatment stage, the precipitant is then generally recovered for reuse by an acid or alkali regeneration and reconstitution process. A strong alkali such as sodium hydroxide or a weak alkali such as sodium carbonate or bicarbonate may be used for this regeneration step.

The present process is of particular utility for a tertiary stage chemical treatment of municipal waste waters for a substantially complete removal of its phosphorus content whereby the phosphate present in the secondary effluent from a water treatment plant is precipitated. In a typical treatment of municipal waste waters, there is a primary settling step for solids removal as a sludge, which is followed by a secondary treatment involving aeration, biological oxidation of organic matter, and further solids precipitation. These two combined steps generally remove no more than about 20 percent of the phosphorus present in sewage. Typically, the effluent from the secondary sedimentation stage still contains between 5 and 50 mg/liter of phosphorus concentration, in the form of orthophosphate and of condensed phosphates such as pyrophosphates and tripolyphosphates.

While the present process is of particular utility for chemically removing phosphorus ions from waste water in a tertiary processing stage, it has been found by M. Ghassemi and H. L. Recht that raw sewage may also be effectively treated in a primary treatment stage with a trivalent rare earth ion precipitant for the removal of phosphates therefrom. For example, a raw sewage waste water was obtained which contained 7.5 mg/liter P total phosphate, 182 mg/liter suspended solids, 310 mg/liter Chemical Oxygen Demand (COD), and 52 units of color, as determined using standard methods of the American Public Health Association. Treatment of such a sample with a lanthanum dose of 59 mg/liter La (150 mg/liter $LaCl_3·6H_2O$) resulted in the removal of all of the phosphates and 86, 84 and 50% reductions in suspended solids, COD, and color, respectively. Thus the addition of a rare earth salt at the primary settling step offers advantages of improved sludge settling and dewatering, reduced Biochemical Oxygen Demand (BOD), and reduced secondary treatment load, yielding greater plant capacity; or a lower BOD load to receiving waters is obtained where secondary treatment is not employed. The sludge beneficiation so achieved may permit direct disposal of the sludge by drying and burning, avoiding the need for anaerobic digestion. Further, the residue from burning the sludge, mainly $LaPO_4$ and $La_2O_3$ but with some CaO, would be reprocessed, for example, by dissolving in acid, precipitating the $La^{+3}$ as the carbonate or oxalate, decomposing this, and regenerating the reagent with acid, e.g., HCl. The primary effluent, with reduced BOD load, could then be processed at higher throughput in the biological oxidation process (secondary treatment) or disposed of directly into receiving waters.

While the present invention is described principally with respect to the removal of orthophosphate from waste water by precipitation with a soluble lanthanum salt, it should be understood that the term orthophosphate is illustrative of dissolved phosphorus ions in general, and is intended to include other phosphate compounds such as condensed phosphates, some of which may be of organic origin.

The trivalent rare earth precipitant ion, preferably lanthanum ion in admixture with other trivalent rare earth ions, will conveniently and preferably be in the form of its chloride, sulfate, nitrate or hydroxide. While lanthanum hydroxide is relatively insoluble compared with lanthanum chloride or sulfate, it is particularly suitable for use in treating municipal waste waters that are acidic. For treatment of non-acidic waste waters, the chloride salt is preferred. Although lanthanum salts are generally preferred because of the greater basicity of lanthanum ion, any one or more trivalent rare earth ions in the form of a suitable salt or salt mixture are useful in the practice of this invention. By the term "rare earth" or "mixed lanthanides" reference is made to the lanthanide series of 15 elements, atomic numbers 57–71, and including yttrium, atomic number 39, which has properties similar to the rare earths and occurs in nature together with the rare earths. The so-called light rare earths, the cerium group (atomic numbers 57–63), because of their basicity are generally preferred as precipitants to the so-called heavy rare earths, the yttrium group (atomic numbers 64–71). However, under conditions of actual plant operation, pure rare earth salts are not ordinarily used, it being more convenient and economical to use suitable naturally occurring or commercially available mixtures or concentrates of the lanthanides. Suitable mineral sources are monazite, bastnasite, and mineral tailings obtained in the processing of uranium-containing mineral ores. Lanthanum constitutes about 25 percent of the cation content of monazite. Bastnasite, which contains more than 30 cation percent lathanum, is readily available commercially in unleached, leached, or calcined form. While trivalent cerium is suitable as an effective precipitant, during the regeneration process it may be converted to the tetravalent state. For continued recycling, it is necessary to maintain it in the trivalent state, which may require an additional processing step. Therefore, the use of substantially cerium-free lanthanides may be economically desirable, where regeneration is contemplated. However, since a detailed study of the present process has been made principally using a lanthanum salt precipitant and aqueous orthophosphate solutions, the preferred embodiment will be described with respect to reaction between trivalent lanthanum ion and orthophosphate ion.

As a further feature of this invention, particularly where it is desired to avoid subsequent regeneration of the rare earth precipitant, a combination precipitation treatment may be used involving treatment of the waste water with aluminum, iron, or calcium salts preceding or concurrent with the use of lesser quantities of rare earth precipitants. Thus, in one modification of the present process, by using this mixed coagulation technique, it has been found feasible to eliminate the need heretofore present for regeneration of the chemical precipitant. At the same time effective removal of the phosphorus content of waste water is provided.

Salts of $Fe^{+3}$, $Al^{+3}$, and $Ca^{+2}$, while effective in precipitating phosphates from waste water, present several drawbacks when used as sole precipitants. Since the optimal pH required for effective precipitation is not that encountered in most waste waters, considerable excess reagent is needed, and the precipitate formed is often in a colloidal form and not readily removable. Such treatment processes require the use of considerable excess reagent, which would then require a recycle process for the economic recovery of the excess reagent. In the present process, where lanthanum or mixed lanthanide salts are used as principal precipitants, highly effective removal of phosphates occurs, but recovery and recycle of the lanthanum salts are ordinarily required. It has now been found that for certain waste water treatments, recovery and recycle processes may be eliminated by utilizing a mixed coagulant precipitation technique. The secondary effluent waste water is treated in a tertiary stage with a less than stoichiometric quantity of the usual reagent, e.g., $Al^{+3}$ or $Fe^{+3}$, to precipitate most of the phosphate, but less than that required for complete removal. Concurrent with or, preferably, subsequent to addition of this usual reagent, a small quantity of a lanthanum or lanthanide reagent as a salt or hydroxide is added to insure relatively complete phosphate removal. By using the mixed coagulant modification, nearly complete phosphate removal is obtained, quantities and cost of the usual Al or Fe reagent are substantially reduced, and quantities and costs of the lanthanum or lanthanide reagent are low; therefore recovery and recycle may not be a requirement for economical operation. Furthermore, the combined precipitation process leads to better precipitate settling so that particle carry-over to the effluent is minimized, thereby improving the process.

Although the mixed coagulant method is of principal interest with respect to the tertiary treatment step, it may be employed in any water treatment where phosphate removal is desired. Thus this modification may also be employed in conjunction with the primary treatment step for certain waste waters. Also, the usual Al or Fe reagent may be used in the primary step while the lanthanide salt is added to the effluent from the secondary treatment process.

By utilizing a combination aluminum-lanthanum or ferric-lanthanum treatment, the requirement for use of a large excess of aluminum or ferric salt is eliminated. Also, the addition of only a small quantity of lanthanum concurrent with or subsequent to treatment with moderate doses of aluminum or ferric salts eliminates the necessity for recovery of lanthanum. Further, the combination of $La^{+3}$ with $Al^{+3}$ or $Fe^{+3}$ will result in the ready precipitation of the more difficultly removable condensed phosphates using moderate precipitant doses. For example, condensed phosphates such as tripolyphosphates are effectively removed by lanthanum salts in comparison to aluminum or iron salts. Thus at a 1:1 cation to phosphate equivalence ratio and for an initial tripolyphosphate concentration of 21.6 mg/liter P, no removal of tripolyphosphate was obtained using aluminum salts at several pH levels. Lanthanum, on the other hand, showed good removal of this condensed phosphate over a broad pH range with a minimum residual phosphate concentration of 0.18 mg/liter P.

While the relative amounts of the lanthanum or lanthanide ions in relation to the aluminum and ferric ions should be as small as possible in the combined aluminum-lanthanum or ferric-lanthanum treatment process, this may be varied over a relatively wide range. However, since a principal feature of the combination mixed-coagulant process is the avoidance of regeneration and reuse of the lanthanum, desirably the amount of lanthanum present should be as small as possible consistent with optimum precipitation of phosphate. Thereby with but a small quantity of lanthanum required for the precipitation reaction, the regeneration of lanthanum no longer becomes an economic necessity. Also, by using a small quantity of lanthanum in place of the large excess of aluminum or iron which would be required for complete precipitation of phosphate, a substantially smaller volume of sludge is formed. This results in a considerable saving in the cost of sludge processing and disposal.

In the phosphate removal step, sufficient $La^{+3}$ is ordinarily utilized in order that the treated water have a minimal residual phosphorus content. Generally, where an alkaline waste water is treated with amounts of lanthanum salts in excess of stoichiometric phosphate requirements, most of the excess $La^{+3}$ used as precipitant is co-precipitated. Some unreacted excess precipitant may be present in solution, particularly in waters of lower pH. A low residual of precipitant metal ion is generally required for the removal process to be technically and economically effective.

It has been discovered by H. L. Recht and M. Ghassemi that the presence of carbon dioxide, carbonate ion, or bicarbonate ion in waste water is particularly effective in providing for removal of unreacted excess metal ion reagent employed in removing the phosphorus components from the waste water. Where the particular waste water being treated is low in bicarbonate or carbonate alkalinity, most of the $La^{+3}$ used as precipitant for the phosphate is precipitated as $LaPO_4 \cdot 3H_2O$ or as a mixed hydroxide-phosphate, e.g., $9LaPO_4 \cdot La(OH)_3 \cdot 28H_2O$. Therefore lanthanum recovery, whether stoichiometric or excess amounts are initially used, will be relatively complete prior to return of the treated water for reuse. However, unreacted precipitant metal ions may still be present in solution. In accordance with this process of Recht and Ghassemi, which is described and claimed in copending application Ser. No. 77,390, filed Oct. 1, 1970, control of the carbonate content of the waste water to maintain a desired bicarbonate or carbonate alkalinity, generally at a pH between about 7 and 8, will result in precipitation of the unreacted lanthanum by formation of a precipitate believed to have the exemplary formula $La_2(CO_3)_3 \cdot 8H_2O$. Such a precipitate is formed when $La^{+3}$ is reacted with bicarbonate or carbonate solutions.

Various techniques may be utilized in performing the carbonate control. Thus, for a waste water containing bicarbonate, it has been observed that at a 1:1 lanthanum to phosphate molar ratio, a minimum residual phosphate concentration of less than 0.01 mg/liter P was obtained at pH's 5.0 and 5.5. With pure phosphate solutions, phosphate residuals less than 0.01 mg/liter are obtained throughout the pH 5–9 region. It is thus noted that phosphate removal efficiency is reduced somewhat in the presence of bicarbonate, and becomes especially pronounced as the pH is raised, and is believed attributable to the formation of lanthanum carbonate. Thus it may be desirable to first precipitate and separate phosphate before adding bicarbonate. Following this, the carbonate or bicarbonate alkalinity of the waste water is increased by directly adding sodium bicarbonate, sodium carbonate, or carbon dioxide to the waste water to then precipitate the excess lanthanum present as a carbonate.

It has been found that most secondary effluent waste waters contain appreciable quantities of bicarbonate alkalinity. Thus the further addition of carbonate to control the lanthanum in the water treatment process will depend upon the carbonate alkalinity already present and the desired pH to be utilized for treatment. While there will result a reduced efficiency of phosphate removal in the presence of bicarbonate ion, complete precipitation of phosphate can be achieved by using an excess of the lanthanum salt. At a pH of 7.2, for example, the use of a 2:1 lanthanum to phosphate molar ratio ($0.772 \times 10^{-3}$M La) resulted in a residual phosphate concentration of less than 0.01 mg/liter P. The excess lanthanum added to the phosphate solution which contained bicarbonate was precipitated as lanthanum carbonate.

Thus by use of the afore-mentioned process of carbonate control of Recht and Ghassemi, complete removal of phosphates from waste water and full recovery of the lanthanum or lanthanide salts can be achieved. Depending upon the carbonate treatment utilized and the excess lanthanum salts used, the excess lanthanum may be removed by coprecipitating with the phosphates as a lanthanum carbonate-lanthanum phosphate mixed precipitate; recarbonation may be utilized to precipitate any unreacted lanthanum in solution as the carbonate. This process of carbonate control of the phosphate precipitation process while utilizable with the present invention to optimize the precipitation of phosphate with lanthanum is recognized as the invention of H. L. Recht and M. Ghassemi and is described and claimed in copending application Ser. No. 77,390, filed Oct. 1, 1970 and assigned to the assignee of the present application.

For purposes of illustration, the preferred embodiment of the invention shown in the sole FIGURE of the drawing will be described with respect to the removal of orthophosphate from waste water by precipitation with a soluble lanthanum salt, followed by regeneration of the precipitant.

The exemplary precipitation and regeneration reactions may be ideally represented as follows:

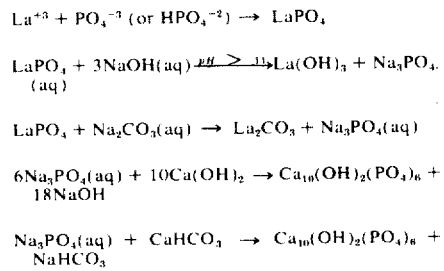

Referring to the drawing, a phosphorus-containing waste water 1, generally a secondary effluent from a treatment plant, is reacted with a trivalent lanthanum ion 2 in a suitable reaction vessel 3. Tananaev and coworkers (Zhur. Neorgan. Khim. 8, 1070 (1963)1 9, 213, 2111, 2283 (1964)) have reported a solubility product ($K_{sp}$) of $LaPO_4$ of $3.75 \times 10^{-23}$. They have also reported precipitation of $9LaPO_4 \cdot La(OH)_3 \cdot 28H_2O$, using an excess of $La^{+3}$, whereas $LaPO_4 \cdot 3H_2O$ is precipitated when stoichiometric quantities of $La^{+3}$ and $PO_4^{-3}$ are used. Accordingly, it will be particularly preferred to use stoichiometric quantities and up to 50 percent ionic equivalent excess of the trivalent cation for purposes of precipitation in order to obtain a minimally hydrolyzed simple phosphate product, i.e., a cation to anion equivalent ratio between 1 and 1.5. However, depending upon other steps in the process, a cation to anion equivalent ratio varying from 0.5 to 5 is generally preferred and employed.

The waste water containing the precipitated $LaPO_4$ is removed from vessel 3 by way of a conduit 4 to a filtration unit 5 for collection of the insoluble $LaPO_4$. Where desired, other suitable separation means may be employed such as decantation and centrifugation. The treated water is removed from filter 5 by way of a conduit 6. Ideally, this tertiary precipitation treatment will result in a treated water having a phosphorus content of less than 0.1 mg/liter P. This treated water may be further treated for reuse as a potable water source or may be directly disposed of as a treated waste water that is no longer a source of phosphate contamination, for example, for ground water recharge. In this phosphate removal step, any excess $La^{+3}$ used as precipitant is precipitated as $LaPO_4 \cdot 3H_2O$ or as mixed hydroxide-phosphate, e.g., $9LaPO_4 \cdot La(OH)_3 \cdot 28H_2O$. Therefore lanthanum recovery, whether stoichiometric or excess amounts are initially used, is essentially complete prior to return of the treated water for reuse.

While chemical precipitation in a tertiary stage of water treatment is considered a highly efficient method for removing phosphate from secondary effluent, the costs involved have been relatively high, particularly because of the excessive amounts of chemicals heretofore required in order to effectively remove at least 90 to 95 percent of the phosphorus content of waste water. Accordingly, for an economical process, regeneration of the chemical precipitant is generally required. The present process is readily adaptable to and particularly suitable for such a regeneration treatment.

Where lanthanum or mixed lanthanide salts are the principal precipitants used, then regeneration of the chemical precipitant is desired. In the present process, either an acid treatment, e.g., with $H_2SO_4$, or an alkali treatment with a strong or weak alkali is suitable for regeneration. An initial acid treatment of $LaPO_4$ with $H_2SO_4$ produces a mixed phosphate and sulfate solution of relatively low pH. The $La^{+3}$ is precipitated from this solution as the oxalate, which in turn is ignited to form the oxide, this then being reused for removal of phosphate from the waste water. In such a recovery process $H_2SO_4$ and oxalic acid (or sodium oxalate) are consumed as part of the costs of the process. However, with the alkali process where consumption of $Ca(OH)_2$ occurs, the formed product, e.g., $Ca_{10}(OH)_2(PO_4)_6$, offers byproduct credit because of its potential usefulness in agriculture. Therefore, an alkali regeneration process, illustrated in the drawing, is preferred.

Referring to the drawing, the $LaPO_4$ precipitate from filter 5 is led by way of a conduit 7, either as a solid or in the form of a slurry, to a reaction vessel 8 where it reacts with a concentrated aqueous sodium hydroxide solution 9 which is led to reaction vessel 8 by way of a conduit 10. To accelerate reaction rates, elevated temperatures below the solution boiling point are preferably used in this stage. Temperatures between 40° and 90°C are suitable. The extent of conversion of the $LaPO_4$ to $La(OH)_3$ is dependent upon the concentration of the NaOH solution as well as the temperature of reaction and the reaction time. The correlation and optimization of these parameters may be readily determined by routine experimentation. Generally a stoichiometric excess amount of concentrated sodium hydroxide solution having a pH above 11 is preferred for optimum conversion of the $LaPO_4$, preferably at a temperature between 70° and 90°C. Where room temperature operation is used, a suitable reaction time will vary from 30 minutes to about 10 hours, increasing the temperature serving to shorten the reaction time. Any unconverted solid $LaPO_4$ will be carried through in subsequent steps of the process and may then be later separated and returned for alkali regeneration in vessel 8.

The addition of lime, which is inexpensive, is preferably employed at this point in the cycle to reconstitute the sodium hydroxide and to reduce the phosphate concentration. Some phosphate carryover at this point in the cycle has little effect on the ultimate phosphate content of the treated waste water. Therefore, substantially complete removal is not needed, in contrast to the water treatment step in vessel 3.

The sodium phosphate-sodium hydroxide solution containing the relatively insoluble $La(OH)_3$ in vessel 8 is led by way of a conduit 11 to a filter 12 where the precipitated $La(OH)_3$ is removed. The sodium phosphate-sodium hydroxide solution is removed from filter 12 by way of a conduit 13 to a reaction vessel 14. A source of lime 15 is led by way of a conduit 16 to reaction vessel 14 wherein by reaction with $Na_3PO_4$ an insoluble calcium complex salt, e.g., $Ca_{10}(OH)_2(PO_4)_6$, is formed, the sodium hydroxide being reconstituted at the same time. This mixture in vessel 14 is led by way of a conduit 17 to a filter 18 to separate the calcium phosphate complex and at the same time return the sodium hydroxide by way of a conduit 19 to sodium hydroxide storage vessel 9 for recycle in the process. The formed calcium phosphate complex may be disposed of as a waste product or used as a source of lime and phosphorus for agricultural purposes.

Relatively insoluble $La(OH)_3$ formed during the alkali regeneration of $LaPO_4$ may be of use for direct addition to acidic waste water. This will permit neutralization and phosphate removal to be done in one step. However, the principal reconstitution route will be conversion of the $La(OH)_3$ to an aqueous solution of $LaCl_3$ or $La_2(SO_4)_3$ using the appropriate hydrochloric or sulfuric acid, respectively. Conversion to the chloride salt is generally preferred because of its greater solubility. Thus, mineral acid, e.g., HCl, in a vessel 20 is led by way of a conduit 21 to a reaction vessel 22 where it is reacted with $La(OH)_3$ which is led into vessel 22 by way of a conduit 23 from filter 12. The reconstituted lanthanum chloride is then led by way of a conduit 24 for return to the lanthanum storage vessel 2 for recycle in the process.

While the use of a strong alkali for the regeneration of lanthanides is generally preferable, for certain applications the use of a weak alkali such as bicarbonate or carbonate is desirable. Thus the precipitate obtained in the phosphate removal step is treated with a concentrated solution of sodium bicarbonate or sodium carbonate, or the solution containing the precipitate is carbonated under controlled pH conditions to convert the lanthanide phosphates to lanthanide carbonates and to release the phosphate to solution. The lanthanide carbonate precipitate is collected, acidified if necessary, and reused for phosphate precipitation. The rejected phosphate solution is treated with a suitable calcium compound, e.g., lime or calcium carbonate, to precipitate the phosphate. If lime is used as a calcium source, phosphate precipitation may involve a simultaneous precipitation of some calcium carbonate. In this case, the precipitate can be calcined to convert the carbonate to calcium oxide and carbon dioxide. The carbon dioxide is added to the lime-treated solution to regenerate the carbonate, and the calcium oxide is slaked and reused in the process.

The following examples illustrate this invention and set forth the advantageous results obtained by the practice thereof, but are not to be construed as limitations of the invention.

EXAMPLE 1

Precipitation of Orthophosphates

A series of 12 tests were run in which solutions of lanthanum nitrate were added to stirred phosphate solutions, which contained $Na_2HPO_4$ solutions at concentrations of 1 or 50 mg/liter P. Solutions of pH 6, 7, 8, and 9 were prepared by adjustment with additions of either $H_2SO_4$ or NaOH solutions of appropriate concentrations. The lanthanum additions were 5 percent in excess of stoichiometric, a 50 percent excess being used for one of the runs. The stirring was continued for about 30 minutes, the precipitates allowed to settle and the solutions then filtered. The obtained precipitates and filtrates were analyzed.

Using a 5 percent stoichiometric excess of $La^{+3}$, phosphate phosphorus concentrations were reduced from 1 mg/liter to less than 0.02 mg/liter at pH 8. Final concentrations were about 0.03 mg/liter at pH's of 7 and 9. These correspond to 97 percent or better removal. Residual $La^{+3}$ was generally less than 0.05 mg/liter corresponding to a carryover (loss) of less than 1 percent. With phosphorus concentrations of 50 mg/liter, final concentrations ranged from a high of 0.93 mg/liter (98 percent removal) at pH 6 to a low of 0.07 mg/liter (99.9 percent removal) at pH 8. Lanthanum carryover was less than 0.09 percent, even without precipitation as $La(OH)_3$.

With a 50 percent excess of $La^{+3}$ and 50 mg/liter P at pH 8, final phosphorus concentration was less than 0.02 mg/liter (99.9 percent removal). Lanthanum carryover was reduced to less than 0.09 percent by precipitation as $La(OH)_3$ at pH 12 (6.4 percent remained in solution prior to pH adjustment).

EXAMPLE 2

Precipitation of Condensed Phosphates

The initial phosphate concentrations of the condensed phosphates were tetrasodium pyrophosphate 18 mg/liter P and sodium tripolyphosphate 21.6 mg/liter P. The precipitation experiments were carried out at an ambient temperature of about 25°C using solutions of lanthanum nitrate added to the stirred solutions of condensed phosphates. pH adjustments were made by prior addition of NaOH or HCl to the photphate test solution. As with the precipitation of orthophosphate, the extent of polyphosphate removal with lanthanum was found to be a function of solution pH and reactant ratios. The optimum precipitation pH range for both pyrophosphate and tripolyphosphate was found to be 5.5–6.0 at a 1:1 lanthanum to phosphate equivalence ratio, and 7–9 at a 2:1 ratio. Minimum pyrophosphate residuals of 0.06 and 0.0002 mg/liter P and minimum tripolyphosphate residuals of 0.18 and 0.007 mg/liter P were observed for 1:1 and 2:1 lanthanum to phosphate ratios, respectively. At a 0.5:1 lanthanum to tripolyphosphate ratio, no phosphate removal was observed at any of the pH levels.

EXAMPLE 3

Comparison of Lanthanum (III) and Aluminum (III) as Precipitants

A series of tests were run similar to those in Example 1 for precipitation of orthophosphates and in Example 2 for precipitation of condensed phosphates using lanthanum nitrate and aluminum nitrate solutions as precipitants.

As shown in Table 1, La(III) had a broader effective pH range and yielded a lower residual phosphate concentration than did Al(III) for the precipitation of phosphates. Thus at a 2:1 cation-to-phosphate equivalence ratio, with phosphates at about 0.001 N, La(III) gave a residual phosphate concentration of less than 0.1 mg/liter P for both ortho- and condensed phosphates over a pH range of 6–9. With Al(III), this same residual phosphate concentration was obtained only with orthophosphate, and only at a pH of 6.

In further test studies using an actual waste water obtained as a secondary effluent from a municipal sewage treatment plant, it was found that, as with synthetic waste water solutions, a lower residual phosphate level was produced over a wider pH range with La(III) as compared with Al(III). At a 2:1 cation-to-phosphate equivalence ratio, a residual phosphate concentration of less than 0.1 mg/liter P was obtained with La(III) over a pH range of 4.5–8.5; Al(III) gave this residual concentration only over a pH range of 5–6.5, and left 0.3 mg/liter P at a pH of 7. Since domestic waste water has a pH of about 7–8, lanthanum is thus effective for the removal of phosphates without any requirement for pH adjustment. To reach the optimum precipitation pH of 6 with aluminum, large quantities of acid, or a considerable excess of aluminum salt, must be added to the waste water to overcome its natural buffer capacity.

Table 1

Summary of Phosphate Removal Data for La(III) and Al(III) Precipitants

Initial phosphate concentrations (all 1.16 meq/liter) were: Orthophosphate 12 mg/liter P; Pyrophosphate 18 mg/liter P; and Tripolyphosphate 21.6 mg/liter P.

NI = Not investigated; NE = Not effective. Temperature of 25°C.

| Item | Reactant Equivalence Ratio | | | |
| --- | --- | --- | --- | --- |
| | 1:1 | | 2:1 | |
| Precipitant | La(III) | Al(III) | La(III) | Al(III) |
| Optimum pH for $PO_4^{-3}$ precipitation | 5–9 | 5.5 | 5–9 | 5.5 |
| Residual $PO_4^{-3}$ at optimum pH (mg/liter P) | <0.01 | 3.5 | <0.01 | 0.1 |
| Optimum pH for pyrophosphate precipitation | 5.6 | NI | 7.5–9 | 5.5 |
| Residual pyrophosphate at optimum pH (mg/liter P) | 0.04 | NI | 0.002 | 0.9 |
| Optimum pH for tripolyphosphate (TPP) precipitation | 6.0 | NE | 8.7 | 5.5 |
| Residual TPP at optimum pH (mg/liter P) | 0.2 | NE | 0.007 | 4 |

The settling properties of lanthanum phosphate were compared with those of aluminum phosphate. Experiments were conducted using orthophosphate solutions (12 mg/liter P) and salts of La (pH 7) and Al (pH 6) at 1:1 cation-to-phosphate molar ratios. After mixing and flocculation, the precipitates were permitted to undergo quiescent settling. Samples were taken at specified intervals and analyzed. Turbidity was measured in standard Jackson Turbidity Units (JTU). With La(III), no further decrease in turbidity (0.28 JTU) or in concentration of either La(III) (1.5 mg/liter) or phosphate (0.29 mg/liter P) was observed after 20 minutes. Thus plain sedimentation without filtration resulted in greater than 97 percent phosphate removal with about 3 percent La loss. In contrast to this rapid and effective settling with lanthanum phosphate, the aluminum phosphate precipitate showed a turbidity of 1.75 JTU, even after standing for 1 hour. The extent of phosphate removal on settling corresponded to only 89 percent of that obtained by filtering the same sample.

EXAMPLE 4

Precipitation of Orthophosphate Using Mixed Lanthanides

A commercial lanthanide mixture, didymium chloride, having the following approximate rare earth composition was used:

| | Weight Percent (as oxides) |
|---|---|
| Lanthanum oxide, $La_2O_3$ | 40–45 |
| Cerium oxide, $CeO_2$ | 1–2 |
| Praseodymium oxide, $Pr_6O_{11}$ | 8–12 |
| Neodymium oxide, $Nd_2O_3$ | 32–37 |
| Samarium oxide, $Sm_2O_3$ | 3–6 |
| Gadolinium oxide, $Gd_2O_3$ | 2–4 |
| Yttrium oxide, $Y_2O_3$ | 0.2–1.0 |
| Other rare earth oxides | 1–2 |

Sodium monohydrogen phosphate was used to prepare a 12 mg/liter P ($3.86 \times 10^{-4}$ M) solution of orthphosphate. The effect of pH on phosphate removal efficiency was evaluated over a pH range of 2–12 using a lanthanide-to-phosphate molar ratio of 1:1. The lanthanide-to-orthophosphate reaction was conducted at a pH of 7.0 using lanthanide-to-phosphate molar ratios ranging from 0.2:1 to 1.2:1. It was found that over a broad pH region of 4–9, maximum removal of phosphate was obtained in the pH 5–8 range. A residual phosphate concentration of 0.42–0.45 mg/liter P was observed in this pH range. It was found that at a pH of 7.0, complete removal of phosphate was achieved at a lanthanide-to-phosphate molar ratio of approximately 1.04. Up to this ratio of the reactants, the removal of phosphate was found to be directly proportional to the amount of added lanthanides. It was thus found that the difference between the reactive capacity of pure La(III) and mixed lanthanides is very small, and that phosphate precipitation with mixed lanthanides is essentially similar to that for a pure lanthanum salt. In both cases a good correlation existed between the formation, settleability, and filterability of the precipitate and the extent of phosphate removal.

EXAMPLE 5

Precipitation of Condensed Phosphates Using Mixed Lanthanides

The effectiveness of mixed lanthanides to precipitate polyphosphates was evaluated as a function of pH using a 21.6 mg/liter P solution of sodium tripolyphosphate and a mixed lanthanide (didymium chloride) dose of 276 mg/liter $DiCl_3 \cdot 6H_2O$ (lanthanide-to-phosphate equivalence ratio of approximately 2:1). The results obtained with the mixed lanthanides were essentially similar to those obtained when the mixed lanthanides were used for the precipitation of orthophosphate as described in Example 4, including the broad effective pH range of phosphate removal and the low concentration of residual phosphate.

EXAMPLE 6

Combined Aluminum-Lanthanum Precipitant

A precipitation treatment using aluminum alone was compared with a combined aluminum-lanthanum treatment. Where aluminum(III) nitrate was the sole precipitant, phosphate was precipitated at a pH of 7.5 from a synthetic waste water solution containing 12 mg/liter P $Na_2HPO_4$ and 210 mg/liter $NaHCO_3$ using aluminum-to-phosphate molar ratios ranging from 1.5:1 to 4:1. Following flocculation and settling, samples were filtered and the filtrates then analyzed for residual phosphate. Turbidity data were also obtained for samples prior to and after filtration. The results of the aluminum experiments are shown in Table 2.

Table 2

Phosphate Precipitation Using Aluminum (III) Nitrate
(Phosphate Solution Used: 12 mg/liter P $Na_2HPO_4$
Containing 210 mg/liter $NaHCO_3$; Precipitation at pH of 7.5)

| Al(III)/$PO_4^{-3}$ Molar Ratio | mg/liter (Alum) $Al_2(SO_4)_3 \cdot 14H_2O$ Equivalent | Residual Phosphate (mg/liter P) | Turbidity (JTU) Settled Unfiltered | Filtered |
|---|---|---|---|---|
| 1.5 | 174 | 2.35 | 3.00 | 0.08 |
| 2.0 | 232 | 0.61 | 0.85 | 0.14 |
| 2.4 | 278 | 0.21 | 0.90 | 0.16 |
| 2.8 | 325 | 0.23 | 0.70 | 0.13 |
| 3.2 | 371 | 0.08 | 0.43 | 0.16 |
| 4.0 | 464 | 0.03 | 0.45 | 0.20 |

As shown in Table 2, for the aluminum-to-phosphate molar ratios examined, the molar capacity of aluminum to precipitate phosphate decreased with an increase in the concentration of added aluminum. A near complete removal of phosphate required more than a threefold molar excess of aluminum.

For the combined aluminum-lanthanum treatment, aluminum was first added to the synthetic waste water samples at aluminum-to-phosphate molar ratios of 1.5:1 and 2:1. After 1–2 minutes of rapid mixing, lanthanum was added in sufficient quantities to establish lanthanum-to-phosphate molar ratios ranging from 0.1:1 to 0.6:1. In all cases the solution pH was maintained at 7.5 through concurrent addition of NaOH. The data for the aluminum-lanthanum combination treatment are shown in Tables 3 and 4.

Table 3

Phosphate Precipitation Using Aluminum (III)-Lanthanum(III)
Combination Treatment
(Phosphate Solution Used: 12 mg/liter P $Na_2HPO_4$ Containing
210 mg/liter $NaHCO_3$) Precipitation at pH of 7.5; Aluminum-
to-Phosphate Molar Ratio Used: 1.5:1 (mg/liter alum
equivalent of 174)

| La(III)/$PO_4^{-3}$ Molar Ratio | mg/liter Mixed Lanthanide Chloride Equivalent* | Residual Phosphate (mg/liter P) | Residual La (mg/liter) | Turbidity (JTU) | |
|---|---|---|---|---|---|
| | | | | Settled Unfiltered | Filtered |
| 0.1 | 13.8 | 1.3 | — | 0.55 | 0.07 |
| 0.2 | 27.6 | 0.45 | — | 0.48 | 0.07 |
| 0.3 | 41.4 | 0.26 | <0.1 | 0.30 | 0.06 |
| 0.4 | 55.2 | 0.07 | <0.1 | 0.85 | 0.08 |
| 0.5 | 69.0 | 0.03 | — | 0.53 | 0.15 |
| 0.6 | 82.8 | 0.01 | — | 0.68 | 0.08 |

Table 4

Phosphate Precipitation Using Aluminum(III)-Lanthanum(III)
Combination Treatment
(Phosphate Solution Used: 12 mg/liter P $Na_2HPO_4$ Containing
210 mg/liter $NaHCO_3$) Precipitation at pH of 7.5; Aluminum-
to-Phosphate Molar Ratio Used: 2:1 (mg/liter Alum
Equivalent of 232)

| La(III)/$PO_4^{-3}$ Molar Ratio | mg/liter Mixed Lanthanide Chloride Equivalent* | Residual Phosphate (mg/liter P) | Residual La (mg/liter) | Turbidity (JTU) | |
|---|---|---|---|---|---|
| | | | | Settled Unfiltered | Filtered |
| 0.1 | 13.8 | 0.18 | — | 0.43 | 0.09 |
| 0.2 | 27.6 | <0.01 | — | 0.62 | 0.09 |
| 0.3 | 41.4 | <0.01 | <0.1 | 0.86 | 0.13 |
| 0.4 | 82.8 | <0.01 | <0.1 | 1.00 | 0.43 |

*Based on an average formula weight of 357.36 reported for the mixed lanthanide chloride, $DiCl_3 \cdot 6H_2O$, of Example 4.

As shown in Table 3, for an aluminum-to-phosphate molar ratio of 1.5:1, corresponding to an $Al_2(SO_4)_3 \cdot 14 H_2O$ (alum) dosage of 174 mg/liter, a lanthanum-to-phosphate molar ratio of 0.6:1 (a mixed lanthanide chloride dose of 82.8 mg/liter) is required to achieve a residual phosphate concentration of less than 0.01 mg/liter P. As shown in Table 4, when the aluminum-to-phosphate molar ratio is increased to 2:1, corresponding to an alum dosage of 232 mg/liter, the corresponding lanthanum requirement is reduced to less than 0.2:1 (27.6 mg/liter as mixed lanthanide chloride). The low residual phosphate concentrations of 0.01 mg/liter P and lower, obtained with the combination Al(III)-La(III) treatment shown in Tables 3 and 4, are essentially unattainable with an Al(III) treatment alone, as shown in Table 2, unless extremely high dosages are used.

EXAMPLE 7

Combined Ferric-Lanthanum Treatment

An Fe(III)-La(III) combination treatment was performed using an effluent from an activated sludge sewage treatment plant having a phosphate content of 16 mg/liter P. When Fe(III) alone was used for phosphate precipitation, a cation-to-phosphate molar ratio of more than 2.5:1 was found necessary to achieve residual phosphate concentrations of less than 0.01 mg/liter P.

For the combination treatment, the waste water was first treated with Fe(III) at an Fe/$PO_4$ molar ratio of 1:1. Following 45 minutes of quiescent settling, the supernatant, which had a phosphate content of 5.2 mg/liter P was decanted and treated with sufficient quantities of lanthanum to establish initial lanthanum-to-phosphate molar ratios of from 0.05:1 to 0.30:1. A phosphate residual concentration of 0.15 mg/liter P was obtained with lanthanum-to-phosphate molar ratios of 0.30:1. Extrapolation of the obtained results indicates that a combination treatment using an Fe/$PO_4$ molar ratio of 1.5:1 and an La/$PO_4$ ratio of 0.1:1 would give the same degree of phosphate removal as an iron treatment alone using an Fe/$PO_4$ molar ratio of 2.5:1. The combination treatment also resulted in production of a smaller quantity of sludge, which would therefore result in savings in the costs of sludge processing and disposal.

EXAMPLE 8

Regeneration with NaOH

Four of the lanthanum phosphate precipitates obtained in Example 1 were digested in warm concentrated NaOH, pH above 11, at temperatures between 70° and 90°C. Examination of the residual solids using x-ray diffraction and x-ray fluorescence showed them to be essentially $La(OH)_3$. Residual phosphorus in the solids was of the order of a few tenths percent by weight. Thus, substantially all of the phosphate was converted to a soluble form, with analysis further showing that substantially all of the lanthanum was retained in the precipitate.

In another series of regeneration runs, phosphate was precipitated from 2 liters of synthetic waste water containing 12 mg/liter P $Na_2HPO_4$, 250 mg/liter $NaHCO_3$ and 355 mg/liter $Na_2SO_4$ using a lanthanum-to-phosphate molar ratio of 2:1 at a final solution pH of 7.15. The precipitate obtained by filtration was mixed with 35 ml of 5 N NaOH at room temperature for 15–20 minutes. The resulting slurry was filtered; the obtained precipitate, retained on the membrane filter, was dissolved in 50 ml 0.1 N HCl. This solution and the alkali filtrate were analyzed for phosphate. The ratio of phosphate redissolved by the alkali treatment to that remaining in the precipitate was 5:1.

EXAMPLE 9

Regeneration with Carbonate

A fresh precipitate of lanthanum phosphate was treated with 1 N $NaHCO_3$ for 15 minutes at room temperature. Analysis showed that the ratio of phosphate released to the solution compared to that remaining in the precipitate was about 2:1. The speed of regeneration using carbonate was greater than that with sodium hydroxide in that precipitate settling and filtration proceeded at a more rapid rate. Because of the lower viscosity of the carbonate solution, solid-liquid separation was accomplished more readily. Also, in comparison to regeneration using concentrated alkali, the pH of a saturated solution of sodium bicarbonate is only slightly greater than 8. Therefore requirements for substantial washing and acid treatment to remove excess alkali from the lanthanum hydroxide precipitate separated from the concentrated alkali in the alkali regeneration process, are much less when carbonate regeneration is utilized.

It will be readily apparent that various modifications may be made in the practice of this invention without departing from the spirit thereof. These modifications with respect to temperature, reaction time and concentration of reactants will depend in part upon the particular mixed lanthanide or other rare earth used as precipitant, the nature and concentration of the materials present in the waste water effluent, whether in dissolved form or as suspended solid, and the like. Thus in selecting the mixed lanthanide precipitants, it is generally preferred that the commercially available lanthanide mixtures used be substantially cerium-free, that is, having less than a 2 weight percent cerium content. Tetravalent cerium salts, such as $CeO_2$, are unsuitable for use as precipitants in the present process, and are formed from trivalent cerium salts during a recycle process. Thus an additional processing step may be required to reconvert tetravalent cerium to trivalent cerium. By having an initially low cerium-free content, this possible additional processing step is avoided for a recycle process.

Also, when a combined non-rare earth-rare earth precipitant treatment is used, it is generally preferred to use an Al(III) or Fe(III) to phosphate molar ratio between 1.0:1 and 2.0:1, although wider ranges from 0.5:1 to 3.0:1 may be used. Correspondingly, an La(III) to phosphate molar ratio varying from 0.1:1 to 0.6:1 is preferably used subsequent to or concurrent with use of the non-rare earth precipitant. However, this ratio may be varied within a wide range depending upon whether recovery of the formed lanthanum phosphate precipitate is contemplated. The higher molar ratios of Al(III) or Fe(III) used would call for correspondingly lower ratios of La(III).

Further, while the treatment of phosphate-containing municipal waste water has been principally described herein, the present process is also suitable for the treatment of phosphate-containing waste waters from industrial plants or collected as agricultural run-off waters over concentration ranges of phosphate from about 1 ppm to 1000 ppm and higher. Where acidic waste waters are treated, treatment with a trivalent rare earth anion in its hydroxide form is preferred. For example, lanthanum hydroxide, which is of limited solubility in water, may be added directly to the waste water in solid form or, preferably, dispersed in an aqueous medium.

Thus, while in accordance with the provisions of the Patent Statutes, the principle, preferred construction, and mode of operation of the invention have been explained, and what is now considered to represent its best embodiment has been illustrated and described, it should be understood that within the scope of the appended claims, the invention may be practiced otherwise than as specifically illustrated and described.

We claim:

1. The method for chemically treating waste water to remove phosphate-containing anions present therein which includes the steps for direct removal of said anions consisting essentially of adding a trivalent rare earth cation in soluble form to the waste water to react with the phosphate-containing anions to form an insoluble rare earth precipitate of said trivalent rare earth cation and said phosphate-containing anions in the waste water, and separating this precipitate from the waste water.

2. The method according to claim 1 wherein the equivalent ionic ratio of rare earth cation to phosphate anion used in the precipitation reaction varies from 0.5 to 5.

3. The method according to claim 1 wherein the rare earth precipitant principally contains lanthanum as the chloride, sulfate, or nitrate or as the hydroxide in acid waste water.

4. The method according to claim 1 wherein the rare earth precipitant is a mixture of rare earth salts obtained from a lanthanum-containing mineral source.

5. The method according to claim 4 wherein said mineral source contains less than 2 percent by weight of cerium.

6. The method according to claim 1 wherein in a recycle process, the insoluble rare earth precipitate is separately recovered from the waste water and is reacted with an acid or alkali regenerant to regenerate the rare earth precipitant for recycle in the process.

7. The method according to claim 6 wherein the regenerant is a concentrated aqueous solution of sodium hydroxide or potassium hydroxide.

8. The method according to claim 6 wherein the regenerant is a concentrated aqueous solution of the carbonates or bicarbonates of sodium or potassium.

9. A recycle process for chemically removing soluble phosphates from waste waters containing them which comprises
   a. reacting the phosphate-containing waste water with a trivalent rare earth precipitant at an equivalent ionic ratio of rare earth cation to phosphorus anion of 0.5 to 5 to form an insoluble rare earth phosphate precipitate in the waste water,
   b. separately recovering the phosphate precipitate and substantially phosphate-free waste water,
   c. reacting the recovered phosphate precipitate with a stoiciometric excess of an aqueous alkaline solution of sodium hydroxide, sodium carbonate or sodium bicarbonate to form a corresponding rare earth hydroxide or carbonate precipitate in a corresponding sodium phosphate-sodium hydroxide or sodium phosphate-sodium carbonate solution, d. separately recovering said rare earth hydroxide or carbonate precipitate and said corresponding sodium phosphate-sodium hydroxide or sodium phosphate-sodium carbonate solution, e. reacting said rare earth hydroxide or carbonate precipitate with hydrochloric or sulfuric acid to form a corresponding soluble rare earth salt, and f. returning said soluble rare earth salt to the process for recycle therein.

10. The process according to claim 9 wherein the sodium phosphate-sodium hydroxide or sodium phosphate-sodium carbonate solution of step (d) is reacted respectively with lime or lime and carbon dioxide to form a calcium phosphate precipitate and regenerate the corresponding sodium hydroxide or carbonate solution, said calcium phosphate precipitate then being separately recovered and said regenerated sodium hydroxide or carbonate solution being returned to the process for recycle therein.

11. The process according to claim 9 wherein the recovered phosphate precipitate is reacted in step (c) with a stoichiometric excess of an aqueous sodium hydroxide solution having a pH greater than 11 to form a rare earth hydroxide precipitate and a sodium phosphate-sodium hydroxide solution, the rare earth hydroxide precipitate and the sodium phosphate-sodium hydroxide solution then being separately recovered.

12. The process according to claim 11 wherein the separately recovered sodium phosphate-sodium hydroxide solution is reacted with lime to form a calcium phosphate precipitate and regenerate the sodium hydroxide solution, said calcium phosphate precipitate then being separately recovered and said regenerated sodium hydroxide solution being returned to the process for recycle therein.

13. The process according to claim 9 wherein the rare earth precipitant used to form the rare earth phosphate precipitate formed in step (a) predominantly contains lanthanum chloride or lanthanum sulfate.

14. The process according to claim 9 wherein the phosphate-containing waste water to be treated is acidic and the rare earth precipitant principally contains lanthanum hydroxide.

* * * * *